United States Patent [19]

Lendi et al.

[11] 4,238,885
[45] Dec. 16, 1980

[54] INSTRUMENT FOR MEASUREMENT AND VERIFICATION OF LINEAR DIMENSIONS

[75] Inventors: Georges Lendi, Crissier; Nicolae Voinescu, Lausanne, both of Switzerland

[73] Assignee: Tesa S.A., Renens, Switzerland

[21] Appl. No.: 46,655

[22] Filed: Jun. 8, 1979

[30] Foreign Application Priority Data

Jun. 19, 1978 [CH] Switzerland .................. 6636/78

[51] Int. Cl.³ .............. G01B 7/02; G01B 7/26
[52] U.S. Cl. .................. 33/143 L; 33/143 M; 33/147 N; 33/169 B
[58] Field of Search ............ 33/143 L, 143 M, 143 J, 33/147 N, 169 B, 125 C

[56] References Cited

U.S. PATENT DOCUMENTS

| | | | |
|---|---|---|---|
| 4,008,523 | 2/1977 | von Voros | 33/143 L |
| 4,063,362 | 12/1977 | Amsbury et al. | 33/147 N |
| 4,077,129 | 3/1978 | Nishikata | 33/169 B |

FOREIGN PATENT DOCUMENTS 2710312 9/1978 Fed. Rep. of Germany ........ 33/143 L

Primary Examiner—Willis Little
Attorney, Agent, or Firm—Anthony J. Casella

[57] ABSTRACT

An instrument for the measurement and verification of linear dimensions includes a body equipped with external and internal feelers, a perch mounted in a slideway in the body and equipped with external and internal feelers cooperating with those of the body, and independent depth gauge mounted in a second slideway of the body, and a feeler rod mounted in a third slideway of the body, and cooperating with a contact piece fastened with an inner face of the external feeler of the perch. A movable member of a measurement transducer is selectively connected to the perch, to the gauge and to the feeler rod by a selective coupling device. In turn, a display device with zeroing control is connected to the measurement transducer. In a single apparatus, the subject instrument is capable of measuring and verifying different linear dimensions, such as for instance, the diameter of a shaft, the depth of a blind hole, the length of a shaft or groove, or any reduction of a diameter of a finished part or a part in the course of manufacturing.

10 Claims, 11 Drawing Figures

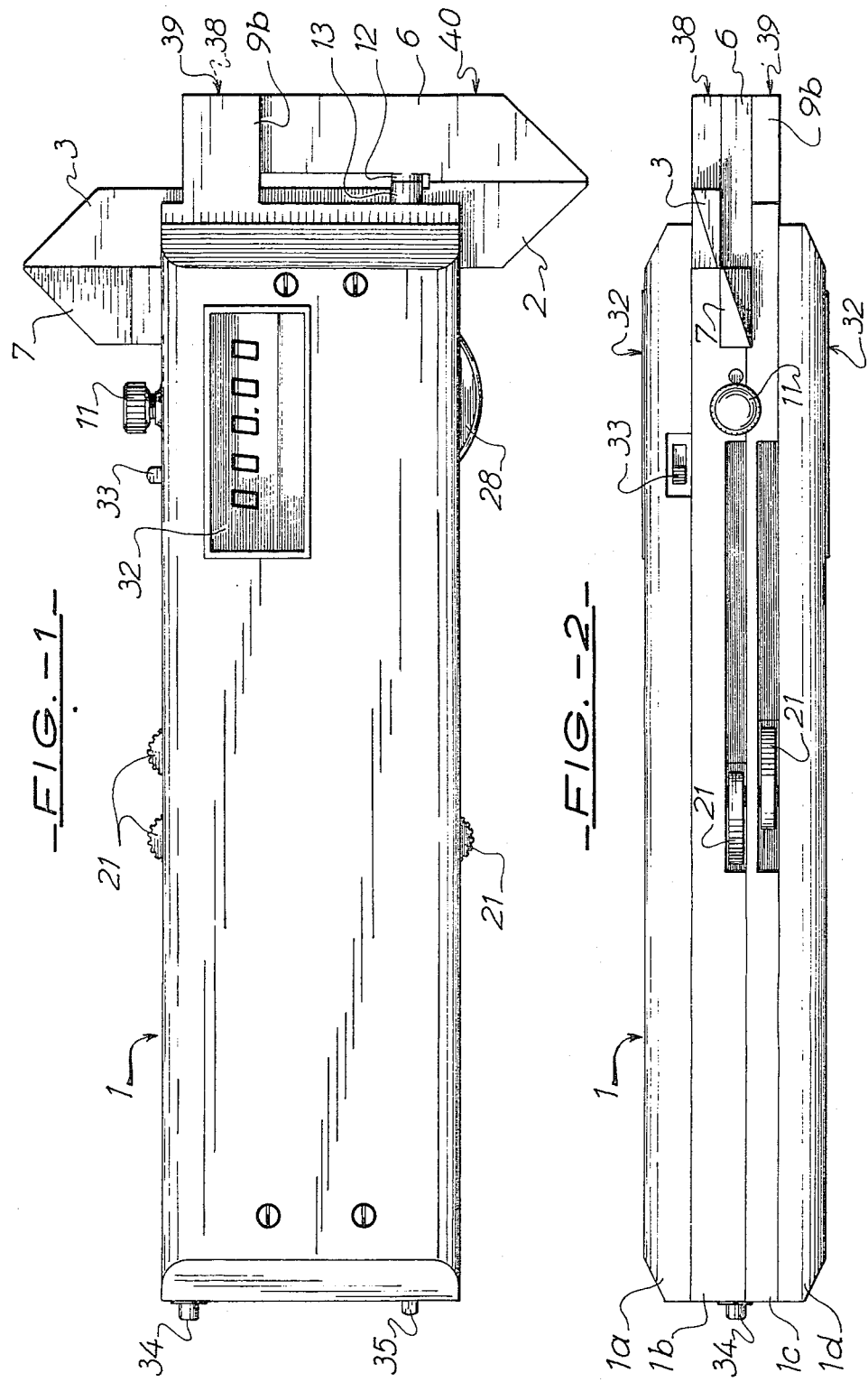

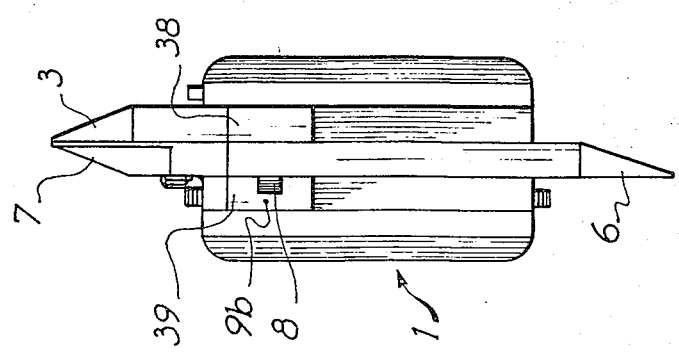
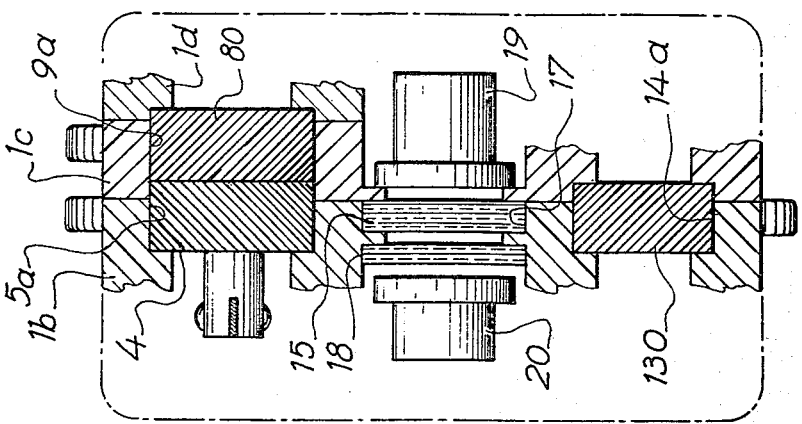
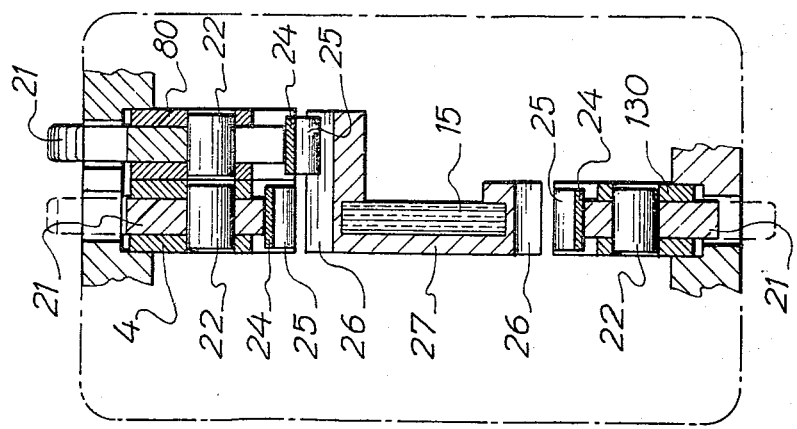

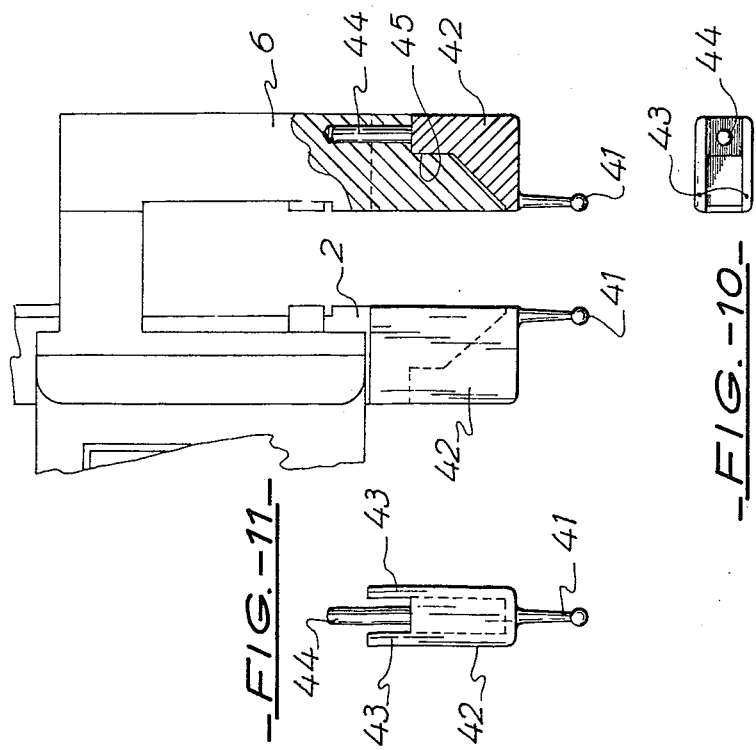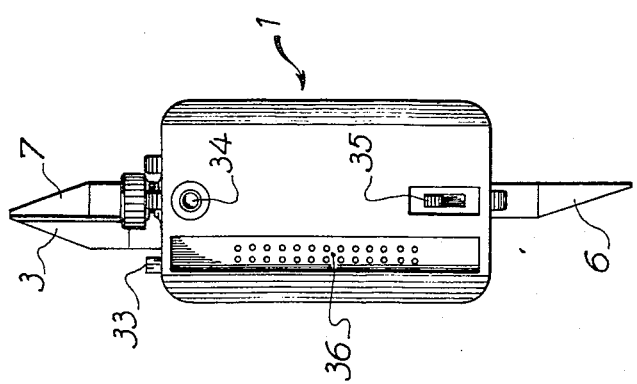

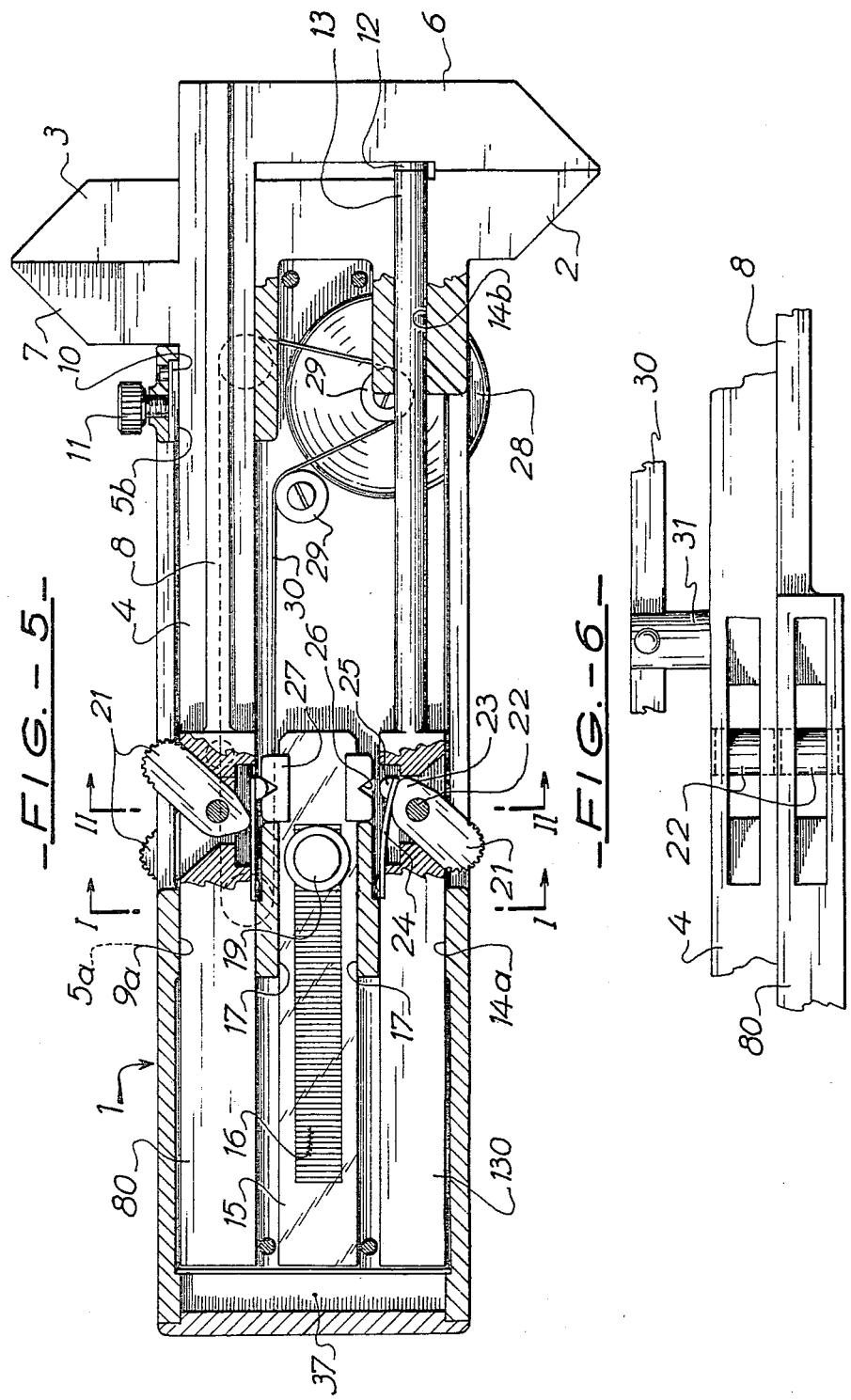

INSTRUMENT FOR MEASUREMENT AND VERIFICATION OF LINEAR DIMENSIONS

The object of the present invention is an instrument for measuring and verifying linear dimensions such as, for instance, the diameter of a shaft or of a journal, the depth of a blind hole, or the length of a shoulder, a groove, or a reduction in diameter of a finished part or a part in the course of manufacture.

A slide caliper which makes it possible to effect such measurements is already known. This caliper has a body and a perch which are mounted for sliding, each equipped with an outer feeler and an inner feeler which cooperate with each other. A depth feeler gauge connected to the body follows the latter in its relative movements of translation with respect to the perch. A graduated rule is mounted on the perch and a reading dial is mounted on the body. The movable indicator of the dial is driven by the perch via a multiplying mechanism and the dial is graduated in sub-multiples of units indicated by the graduations of the rule.

For the lathe or milling machine operator as well as for the manufacturing inspector, this practical and reliable instrument can do excellent service both during manufacture and for the verification of tools and spot verification on a series in course of manufacture or on a finished machine. However, this special slide caliper does not cover the entire range of measurements necessary, particularly the comparative measurements which are obtained with comparators and the fine, absolute measurements which are obtained with the various apparatus known as internal, external, depth and end "micrometers," each coming from an operating process which is different from that of the others.

It is therefore necessary to provide for this work, a set of measuring apparatus of different categories, which are generally not available at the work or verification site and which the mechanic or inspector cannot carry with him permanently. The change from one apparatus to the other therefore requires disturbing trips as well as loss of time.

The measurement and verification instrument in accordance with the invention, whose object is to solve this problem, provides a solution by the fact that, as defined in claim 1, it by itself makes it possible to effect practically all the measurements required by the said work and thus avoid the moving about inherent in the use of several apparatus of different categories.

One embodiment of the subject matter of the invention as well as a variant is shown in the accompanying drawing by way of example.

FIG. 1 is an external overall view in elevation.
FIG. 2 is a top view.
FIG. 3 is a view from the right side.
FIG. 4 is a view from the left side.
FIG. 5 is a partial interior view in elevation.
FIG. 6 is a top view of an enlarged detail of FIG. 5.
FIG. 7 is an enlarged partial section of the section line I—I of FIG. 5.
FIG. 8 is an enlarged partial section along the section line II—II of FIG. 5.
FIG. 9 is a view, half in elevation and half in section, of the variant.
FIG. 10 is a top view of a detail of the variant.
FIG. 11 is a view of this detail from the right-hand side.

The instrument shown in FIGS. 1 to 8 comprises a handling body 1 consisting of four parts $1_a$, $1_b$, $1_c$, and $1_d$ assembled by screwing onto the main element $1_b$ and forming a housing, equipped with an external feeler 2 and an internal feeler 3 in the form of jaws which are rigidly attached by welding to the part $1_b$.

A perch 4 mounted in a slideway consisting of two separate parts $5a$ and $5b$ of the body 1 has an external feeler 6 and an internal feeler 7 also in the form of jaws, which cooperate with the corresponding stationary feelers 2 and 3 of the body 1.

A depth feeler gauge 8 (FIG. 5) is mounted in a second slideway consisting of two separate parts $9a$ and $9b$ of the body, one of which, $9a$, is visible in FIG. 5 and the other, $9b$, in FIG. 3. This depth gauge 8 is applied against the perch 4 and is composed of two distinct parts, one of which, 80, is of the same cross section as the perch 4 and is guided in the slideway $9a$, while the other, the gauge proper 8, of smaller cross section, is guided in the slideway $9b$ which is integral with the element $1_c$ of the body and flush with the outer face of the external feeler 6 of the perch 4.

In the slideway $5b$ of the body 1 there is mounted a blocking shoe 10 for the perch 4, which can be pressed against the perch by means of a clamping screw 11.

The external feeler 6 of the perch 4 has, on its inner face, arranged opposite the external feeler 2 of the body 1, a fixed cylindrical contact piece 12. Facing this contact piece 12, a cylindrical feeler rod 13 is mounted in a third slideway, consisting of two parts $14a$ and $14b$ of the body 1. This feeler rod 13 is of the same cross section as the contact piece 12 and cooperates with the latter; it is extended towards the inside of the body 1 by a part 130 of the same cross section as the perch 4. This part 130 is guided by the part $14a$ of the third slideway, while the rod 13 proper is guided in the part $14b$.

The three movable feeler members which have just been described, the perch 4, the depth gauge 8, and the feeler rod 13, move in translation in parallel in their respective slideways and are independent of each other as well as of a measurement transducer intended to translate their displacement into measurement values.

The transducer in question is in the present case an optical incremental linear measuring device comprising:
 a glass rule 15 engraved with equidistant graduations 16 and mounted in a slideway 17 parallel to the slideways of three aforementioned movable feeler members,
 a fixed reticle 18 (FIG. 7),
 a fixed lamp 19 arranged on the side of the rule 15,
 and a fixed photovoltaic-cell detector 20 arranged on the side of the reticle 18.

In this optical transducer of known type it may be pointed out here that when the rule 15 moves, the detector 20 delivers periodic electric signals by photoelectric scanning of its graduations 16 and that the output signal of this transducer is composed of trains of pulses representing the amplitude and direction of displacement of its movable member, the rule 15.

A selective coupling device is interposed between the movable feeler elements of the instrument and the movable element of the transducer, namely between the perch 4, the gauge 8, the rod 13 and the glass rule 15.

This selective coupling device, visible in the detail view of FIGS. 5, 6, and 8, is formed here of:
 a swivel push member 21 having two positions, mounted in a hole in parts of the same cross section 4,80 and 130 of the perch 4, of the gauge 8, and of the rod 13, and pivoted around a pivot 22, this push member having on the outer side of its pivot a notched contour intended to receive the push and on its inner side an eccentric cam-shaped contour 23;

a spring blade 24, whose one end is rigidly fastened to the aforementioned parts and whose other end has a semicylindrical bolt 25, the free portion of said blade facing the cam 23 of the push member 21;

a keeper 26 formed of a V-shaped groove cut in an end piece 27 rigidly fastened by gluing to the end of the graduated rule 15.

The bolts 25 of the movable feeler members are positioned in such a manner that the latter, when returned to zero measurement position, can be engaged in their respective keepers 26 of the end piece 27 of the graduated rule 15, the latter being at the start of the measurement stroke. This state corresponds to that shown in FIG. 5 in which, however, only the coupling device of the gauge 8 is shown engaged.

In the two positions of tilt of the push member 21, the spring blade 24 is pressed against the cam 23. In order to do this, the blade must have a curved shape at rest, and in engaged position it must be straight and substantially parallel to the longitudinal axis of the feeler members.

In the embodiment described, the push members 21 serve both as coupling member and as manual operating member for the movable feeler members.

In order to permit a finer adjustment of position of the perch 4, the instrument furthermore has a friction drive device, visible in part in FIG. 5, having a knurled drive wheel 28 connected by a transmission with pulleys 29 and endless ribbon 30 to the perch 4, the ribbon being fastened, over a portion of its path which is arranged parallel to the perch, to a drive finger 31 which is rigidly connected to the perch (FIG. 6).

On each of its side walls, the body of the instrument has a digital display panel 32 connected by an electric circuit to the detector 20 of the measurement transducer in traditional manner by a pulse counter, not shown, utilizing the series of pulses of the output signal of the detector 20. Above these two display panels 32 there is arranged, on the body of the instrument, a zeroing control button 33 for the digital display so that in all positions of the graduated rule 15, the counting up and down can find its origin there.

The relatively large thickness of the instrument and, on the other hand, the relatively small thickness of the display panels of this type permit this double arrangement, which is advantageous for left-handed users. However, this detail is not indispensable.

The instrument described furthermore comprises an energy socket 34 on its rear face (FIGS. 1, 2 and 4), an on-off switch 35 and a multi-pin outlet 36, the latter being possibly connected by a multi-wire cable to a central display panel to a memory and/or to a processor for recording, classification, or calculation. However, this outlet is not indispensable either, and the instrument is sufficient by itself for the purpose in view.

The connections of this socket 34, of this switch 35 and of this outlet 36 are housed in a rear compartment 37 of the instrument. The socket 34 can serve either for direct feed from the power line or for charging of cells or batteries incorporated in the instrument.

Finally the elements 1b and 1c of the body 1 bear ground stops 38 and 39 (FIGS. 1, 2, and 3) parallel to the feeler edges of the feelers and flush with the outer face 40 of the external feeler 6 of the perch, this feature, which is also not indispensable, being intended to permit, as an option, abutment measurements and plotting from said stops.

Developed in this manner, and aside from the options indicated above, the measurement instrument of the invention has the following advantages:

It can be used as a conventional slide caliper by coupling in retracted position and in respective abutment either the perch 4 or the depth gauge 8 with the graduated rule 15 of the transducer by means of their respective push member 21, and placing the display of the panel 32 at zero in this position and then operating the feeler member selected by means of this same push member 21.

There can be noted here the advantage obtained by the independence of the depth gauge 8, which makes it possible to cause it to emerge from the body of the side of the external feeler 6 of the perch, which thus has a reference support surface, its outer face 40 which is larger than on a conventional slide caliper where this rest surface consists of the foot of the perch, which is of much smaller width.

It can be used for precision external and internal measurements by adjusting it in the same manner as above, but driving the perch 4 by means of the friction drive device by action on the knurled wheel 28.

Finally, it can be used as a direct-reading micrometer or as a comparator micrometer by means of its contact piece 12 and its feeler rod 13.

In order to do this, in the first case, one couples in zero measurement position, that is to say with the feelers retracted so as to be abutting, both the perch 4 and the feeler rod 13 to the rule 15 and moves them together by means of the knurled drive wheel 28 up to the maximum measurement capacity desired, reading the display obtained on the panel 32. When arriving at this value, the perch 4 is locked by means of the locking screw 11, the display is zeroed by means of the botton 33, whereupon the perch 4 is disengaged by means of its push member 21 while leaving the feeler rod 13 coupled to the rule 15.

At this time, the part held in abutment against the contact member 12 is measured by displacing the feeler rod 13, and the value of this measurement is obtained by direct reading by count-down of the counter starting from the zero signified by the position of maximum capacity set at the start.

In the second case, that of use as comparator, one proceeds substantially in the same manner, but displacing the perch 4 and the feeler rod 13 together by means of the knurled wheel 28 up to the nominal dimension to be verified, reading the display obtained on the panel 32. The display is then placed at zero in this position, whereupon the assembly consisting of the perch and feeler rod is again displaced up to at least the value of the upper tolerance of the nominal dimension adjusted, again reading the display of the panel. Finally, the perch 4 is locked in this last-mentioned position by means of the clamping screw 11 and the perch is disconnected from the rule 15 while leaving the feeler rod 13 coupled. At this time, the feeler rod 13 acts like the movable contact piece of a comparator with respect to its anvil, which in this case is the contact piece 14 of the feeler 6, the counter indicating, by counting up or down with respect to the nominal dimension indicated by the zero, the plus and minus dimensional tolerances of the part checked.

One advantageous variant is shown in FIGS. 9, 10, and 11. This variant consists of two ball measurement contactors 41 attached via two removable housings 42, on which they are fastened, to the external feeler jaws 2 and 6 of the body 1 and the perch 4.

The housings 42 are fitted on the jaws of the calipers and surround the latter by two side walls 43. A centering pin 44, which penetrates into a corresponding borehole of the jaws of the calipers which is produced in the bottom of a notch 45 of the latter, is fastened in the housing 42 between its walls 43.

Due to the positive point contact which is obtained with the balls of the feelers 41, this variant permits precise absolute measurements such as described previously for internal measurements and in particular for center-to-center measurements of boreholes. For this latter measurement, it is, as a matter of fact, possible to measure in succession the distance between the two closest walls of two boreholes by using the contact pieces as external feelers and the distance between their most distant walls by using these contact members as internal feelers. The measurement values obtained are then either used by the operator to obtain therefrom by calculation the center-to-center distance measured in this manner, based on the known diameter of the balls of the contact pieces 41, or else, more advantageously, by connecting the apparatus via its output 36 to a microprocessor which is programmed for this calculation.

Other variants can furthermore be provided.

Thus the optical measurement transducer can be replaced by any other transducer which assures the same functions.

The display panel also can be of any type which assures the reading in absolute and relative values of the measurements effected, provided that it has a zeroing control.

The selective coupling device (21 to 25) for coupling the movable feeler members to the movable element of the transducer may be developed differently, for instance by means of friction drive members or magnetic members controlled by one or more switches.

Finally, the display can be equipped with a memory function in order to facilitate the retention of certain measurements for their subsequent use.

Furthermore, the balls of the accessory contact pieces 41 can be replaced by elements in the shape of right cylinders, for instance for the measurement of boreholes made in thin plates, or by bent elements, for instance for the measurement of grooves made in boreholes.

What is claimed is:

1. An instrument for the measurement and verification of linear dimensions, comprising a body equipped with a fixed external feeler and a fixed internal feeler, a perch mounted in a slideway in the body and equipped with an external feeler and an internal feeler cooperating with the corresponding fixed feelers of the body, a depth feeler gauge independent of the body, said depth feeler gauge mounted in a second slideway of the body, a perch locking member, a contact member fixedly arranged on the external feeler of the perch, opposite the external feeler of the body, a feeler rod movable in a third slideway of the body and cooperating with the fixed contact member of the external feeler of the perch, a measurement transducer interposed between the body and said perch, depth gauge and feeler rod for translating the displacements thereof into measurement values, said measurement transducer having a movable member independent of the perch, depth gauge and feeler rod, at least one selective coupling device interposed between said movable member of the measurement transducer and said perch, depth gauge and feeler rod, and a display device for the display of the measurement values of the measurement transducer, said display device equipped with a zeroing control.

2. A measurement instrument according to claim 1, characterized by the fact that the depth gauge debouches from the body on the side of the external feeler of the perch so that the outer face of the feeler constitutes a depth measurement stop.

3. A measurement instrument according to claim 1, characterized by the fact that the selective coupling device comprises, for each of the movable feeler members, a swivel push member having two positions determined by a cam which cooperates with a bolt mounted on an elastic member fastened to the movable feeler member, and that the movable member of the transducer has a keeper into which the bolt of the movable feeler member engages in one of the two positions of the tilt push member.

4. A measurement instrument according to claim 1, characterized by the fact that the selective coupling device comprises a control member which also constitutes the manual drive member for the movable feeler members.

5. A measurement instrument according to claim 1, characterized by the fact that it comprises a friction drive device for the perch.

6. A measurement instrument according to claim 5, characterized by the fact that the friction drive device for the perch comprises a knurled manual control wheel connected to the perch via a transmission with pulleys and endless ribbon.

7. A measurement instrument according to claim 1, in which the display device is arranged on a side wall of the instrument, characterized by the fact that it comprises a second display device identical to the first and arranged on the opposite side wall of the instrument.

8. A measurement instrument according to claim 1, characterized by the fact that the measurement transducer is an optical incremental transducer, that the display device is digital, and that it comprises a circuit for connecting said transducer to said display device comprising a pulse counter.

9. A measurement instrument according to claim 1, characterized by the fact that the body has stops parallel to the outer face of the external feeler of the perch and to the feeler edges of said feeler and flush with the said outer face.

10. A measurement instrument according to claim 1, characterized by the fact that each external feeler bears a removable support equipped with an accessory contact member, the said removable support comprising a junction and positioning element which cooperates with a corresponding element of the feeler.

* * * * *